United States Patent [19]

Brady

[11] 4,379,130

[45] Apr. 5, 1983

[54] PROCESS FOR REGENERATING SCRUBBING SOLUTIONS

[75] Inventor: Jack D. Brady, Fayetteville, Ga.

[73] Assignee: Andersen 2000 Inc., Atlanta, Ga.

[21] Appl. No.: 303,778

[22] Filed: Sep. 21, 1981

[51] Int. Cl.$^3$ .............................................. C01B 17/00
[52] U.S. Cl. ............................... 423/242; 423/512 A; 423/519
[58] Field of Search .......... 423/242 A, 242 R, 244 A, 423/244 R, 512 A, 519; 23/230 A; 436/55

[56] References Cited

U.S. PATENT DOCUMENTS 3,708,266   1/1973   Gustavsson .......................... 422/178
3,989,797  11/1976   Brady et al. ......................... 423/242

OTHER PUBLICATIONS

Boynton, *Chemistry and Technology of Lime and Limestone* 1966, p. 167.

*Primary Examiner*—O. R. Vertiz
*Assistant Examiner*—Gregory A. Heller
*Attorney, Agent, or Firm*—B. J. Powell

[57] ABSTRACT

A method of regenerating a scrubbing solution containing sodium sulfite, sodium bisulfite, sodium sulfate and sometimes sodium hydroxide circulated in scrubbers to remove sulfur oxides from gas streams where sodium sulfite is converted to sodium bisulfite as sulfur dioxide is absorbed in the scrubbing solution. A portion of the circulating scrubbing solution is bled off for regeneration and reacted with calcium oxide in pebble lime while the pebble lime is impinged against an impingement surface at a velocity of at least 8–10 feet per second to convert the sodium bisulfite back to sodium sulfite and form calcium sulfite precipitate. The calcium sulfite is removed from the regenerated scrubbing solution and the regenerated scrubbing solution returned to the circulating scrubbing solution in the scrubbers.

12 Claims, 2 Drawing Figures

PROCESS FOR REGENERATING SCRUBBING SOLUTIONS

BACKGROUND OF THE INVENTION

This invention relates generally to processes for removing sulfur oxides from gas streams and more particularly to the regeneration of scrubbing solutions used in a scrubber to remove sulfur oxides from gas streams.

It is common practice to remove sulfur oxides, especially sulfur dioxide, from a gas stream by passing the gas stream through a scrubber which contacts the gas stream with an aqueous scrubbing solution containing sodium chemicals that react with the sulfur oxides to remove them from the gas stream. Typically, the sodium chemicals in the scrubbing solution are predominately sodium sulfite, sodium bisulfite and sodium sulfate. The sulfur dioxide in the gas stream will react with sodium sulfite in the scrubbing solution to convert some of the sodium sulfite to sodium bisulfite while removing the sulfur dioxide from the gas stream. If the scrubbing solution contains any sodium hydroxide or sodium carbonate as is sometimes the case, the sulfur dioxide in the gas stream will react with either of these sodium chemicals to form sodium sulfite while removing the sulfur dioxide from the gas stream. The scrubbing solution is separated from the gas stream so that a liquid free gas stream is exhausted from the scrubber. The separated scrubbing solution is collected and recirculated back through the scrubber for further contact with the gas stream to conserve the sodium values in the scrubbing solution.

As the sulfur dioxide reacts with the sodium sulfite in the scrubbing solution, the sodium sulfite concentration will be reduced and thus will reduce the ability of the scrubbing solution to remove sulfur dioxide. One way to maintain the sodium sulfite concentration in the scrubbing solution and thus maintain its sulfur dioxide removal capability is to bleed off and dispose of part of the scrubbing solution while replacing the disposed solution with an aqueous makeup solution containing a sodium chemical that reacts with sodium bisulfite in the scrubbing solution to convert it back to sodium sulfite and/or with the sulfur dioxide to form sodium sulfite. This technique for maintaining the sodium sulfite concentration in the scrubbing solution consumes large quantities of sodium chemicals and also generates a liquid waste for disposal. The costs associated with this technique for the acquisition of the sodium chemicals and for the disposal of the liquid waste are relatively high.

Another way to maintain the sodium sulfite concentration in the scrubbing solution is to bleed off and regenerate part of the scrubbing solution using a calcium compound to convert the sodium bisulfite back to sodium sulfite. U.S. Pat. Nos. 3,911,084 and 3,989,797 disclose this technique. In both of these patents, calcium hydroxide (slaked lime) is reacted with the scrubbing solution to convert the sodium bisulfite back to sodium sulfite and generate insoluble calcium sulfite. The calcium sulfite is then separated from the solution and the regenerate solution returned to the primary scrubbing solution for recirculation in the scrubber. While both of these patents mention that calcium oxide (lime) might be used to regenerate the scrubbing solution, attempts to use calcium oxide have not met with practical success because no way was known to react the calcium oxide with the spent scrubbing solution fast enough to produce a commercially feasible process. As a result, the regeneration of spent scrubbing solutions have in the past been limited to the use of calcium hydroxide (slaked lime). This requirement has increased the cost of the regeneration process since calcium oxide must be hydrated in a slaker to form the slaked lime before being used in the process. Further, the use of slaked lime in the process required careful handling of the calcium sulfite formed in the regenerated solution so that it could be separated from the solution.

SUMMARY OF THE INVENTION

These and other problems associated with prior art processes for the regeneration of scrubbing solutions are overcome by providing a process in which calcium oxide can be reacted directly with the scrubbing solution to convert sodium bisulfite back to sodium sulfite while forming easily separable insoluble calcium sulfite. The process of the invention uses commercially available calcium oxide in the form of pebble lime. The pieces of the pebble lime have a size of about one-fourth to one-half inch in the commercially available form. The pebble lime is added directly to the separated portion of the scrubbing solution in a reactor vessel. The calcium oxide (CaO) at the surface of the pieces of pebble lime initially reacts with the sodium sulfite in the scubbing solution to form sodium hydroxide and produce insoluble calcium sulfite on the surface of the pieces of pebble lime. The thusly formed sodium hydroxide then reacts with the sodium bisulfite in the scrubbing solution to convert it to sodium sulfite. The calcium sulfite produced tends to form a coating on the surface of the pebble lime so as to prevent contact between the scrubbing solution and the calcium oxide in the pebble lime and thus greatly inhibit the reaction of the calcium oxide with the scrubbing solution. To prevent this build-up of the calcium sulfite on the surface of the pieces of pebble lime, the solution and pebble lime are impinged against impingement surfaces at a sufficient velocity to cause the calcium sulfite coating on the pieces of pebble lime to be mechanically removed and thus expose the surface of the pieces of pebble lime for further reaction. As a result, the pieces of pebble lime are consumed by reaction with the sodium sulfite at a commercially acceptable rate. Moreover, the filterability of the resulting solids in the solution is greatly enhanced over that associated with the prior art, thereby significantly reducing the size of the equipment necessary to separate the solids from the regenerated solution before its return to the primary scrubbing solution. As a result, the cost of operating the process of the invention is significantly reduced over that associated with the prior art.

In the process of the invention, a primary aqueous scrubbing solution containing sodium sulfite, sodium bisulfite and sodium sulfate is contacted with a gas stream containing sulfur oxides, principally as sulfur dioxide, in a gas-liquid scrubber. The sulfur dioxide will react with the sodium sulfite in the scrubbing solution to form sodium bisulfite. Any sodium hydroxide or sodium carbonate in the scrubbing solution will react with the sulfur dioxide to form sodium sulfite. After contact with the gas stream, the scrubbing solution is separated from the gas stream, collected, and returned to a recirculation tank to be reused in the scrubber while the liquid free gas stream with the sulfur dioxide removed is exhausted from the scrubber. As the scrubbing solution is circulated through the scrubber and sulfur dioxide reacts therewith, the sodium bisulfite concentration rises at the expense of the sodium sulfite concentration. To conserve the sodium values in the scrubbing solution and maintain the ability of the scrubbing solution to react with the sulfur dioxide in the gas stream, a portion of the scrubbing solution is bled off to a regeneration system to convert the sodium bisulfite back to sodium sulfite and return the regenerated scrubbing solution back to the recirculation tank for reuse. In the regeneration system illustrated, the bled off portion of the scrubbing solution is delivered to an incoming storage tank in the regeneration system. The separated portions of scrubbing solutions from several such scrubbers can be delivered to a common incoming storage tank.

When the level of the separated portion of the scrubbing solution in the incoming storage tank reaches a prescribed level, the scrubbing solution is delivered to a reactor vessel in the regeneration system. Calcium oxide in the form of pebble lime is added to the scrubbing solution in the reactor vessel which reacts with sodium sulfite in the scrubbing solution to form sodium hydroxide and calcium sulfite. The sodium hydroxide will then react with the sodium bisulfite in the scrubbing solution to form sodium sulfite. The scrubbing solution and pebble lime are impinged against an impingement surface in the reactor vessel with a velocity in the order of 8–10 feet per second to cause the calcium sulfite coating being formed on the surface of the pieces of pebble lime to be mechanically removed to maintain the reaction between the pebble lime and the scrubbing solution. The solution and pebble lime are passed down through a draft tube in the reactor vessel by an impeller in the draft tube rotating at an appropriate speed to impart the necessary velocity to the solution and pebble lime and impinge the pebble lime against the bottom of the reactor vessel. The mechanical abrading action removing the calcium sulfite coating from the pieces of pebble lime is produced by the pieces of pebble lime striking the bottom of the reactor vessel, striking the blades of the impeller and striking against each other in the turbulent flow created in the reactor vessel. Without the impingement of the pebble lime to mechanically remove the calcium sulfite coating, less than ten percent of the calcium oxide available in the pebble lime will react with the scrubbing solution. With the impingement, however, over ninety percent of the calcium oxide available in the pebble lime will react with the scrubbing solution. The reactions in the reactor vessel regenerate the sodium bisulfite in the scrubbing solution into sodium sulfite that remains in solution while forming calcium sulfite. The calcium sulfite reacts with the water in the solution to form extremely insoluble hydrated calcium sulfite that is easily separated from the solution. The unreacted solids residue from the reacted pebble lime also remains. The thusly formed slurry of regenerated scrubbing solution, hydrated calcium sulfite, and pebble lime solids residue is drawn out of the reactor vessel through a screen to keep the oversized pebble lime which has not been fully reacted with the scrubbing solution in the reactor vessel.

The withdrawn slurry is passed through a gravity settler which separates the slurry from the reactor into a concentrated slurry in the bottom of the settler and a solids-free regenerated solution which passes out of the top of the settler. The regenerated solution from the top of the settler is routed to an output storage tank while the concentrated slurry from the bottom of the settler is routed to a rotary vacuum filter that separates the solids (hydrated calcium sulfite dihydrate, pebble lime residue, and other particulates) from the regenerated scrubbing solution. The solids-free solution from the rotary filter is also delivered to the output storage tank to be combined with the solids free solution from the settler and thus form the total regenerated scrubbing solution. The regenerated scrubbing solution is pumped to a holding tank through a polishing filter to remove any solids which may remain in the solution. Any make-up water required is added to the holding tank and the resulting solution returned to the recirculation tanks at the scrubbers to maintain the scrubbing solution level in the recirculation tanks. Any sodium values lost due to dragout in the filter cake at the rotary filter are made up by adding a sodium chemical such as sodium hydroxide (caustic soda), sodium carbonate (soda ash) or sodium sulfite to the scrubbing solution in the recirculation tanks.

These and other features and advantages of the invention disclosed herein will become more apparent upon consideration of the following specification and accompanying drawings wherein like characters of reference designate corresponding parts throughout the several views and in which:

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

Figure 1:
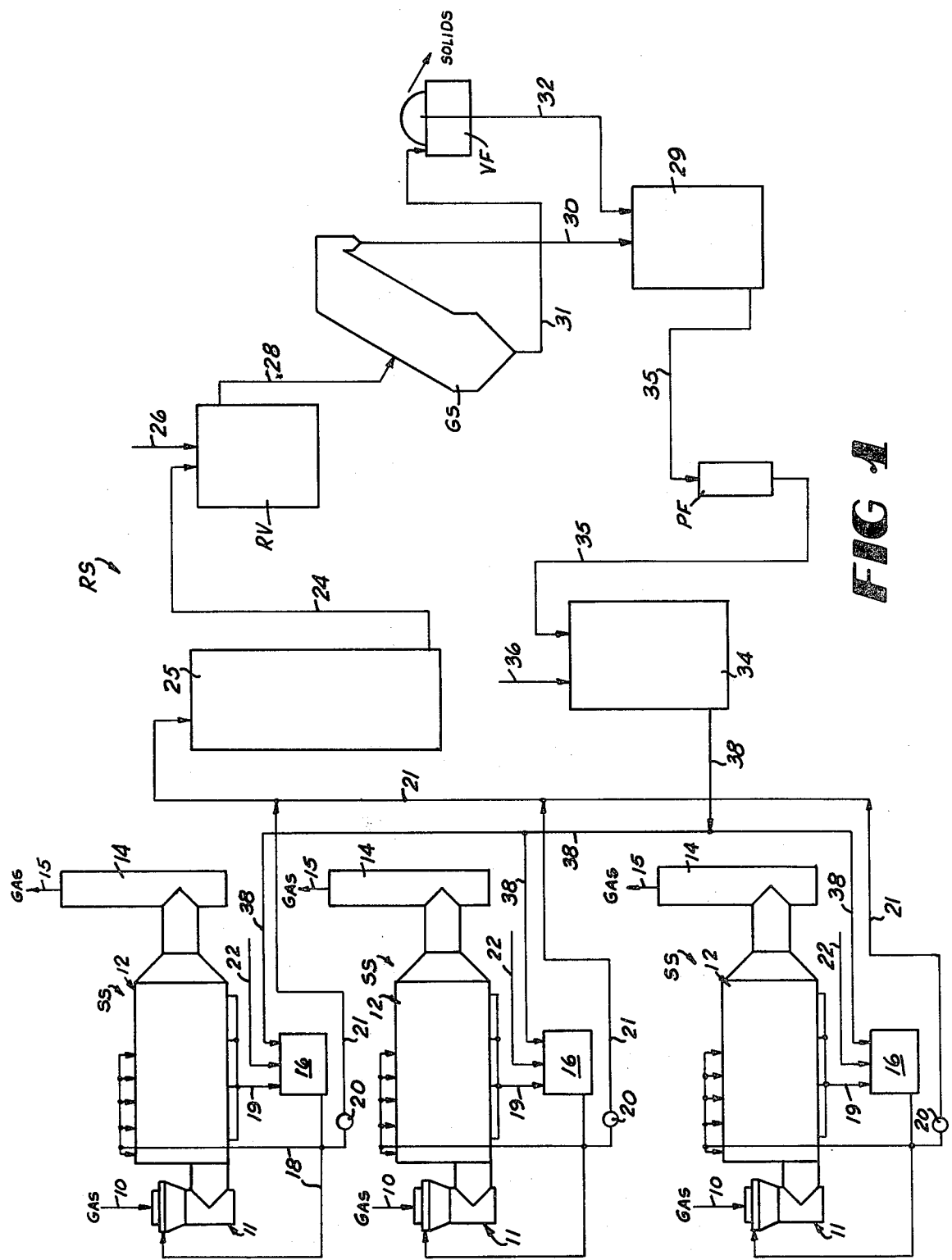
FIG. 1 is a diagrammatic flow sheet illustrating the basic process of the invention.

This process can be used to regenerate sodium sulfite scrubbing solutions from any scrubbing system used to remove sulfur oxides from gas streams. Such gas streams are typically found as flue gases from steam generators fired by sulfur containing fuels such as oil, coal and the like. FIG. 1 is a simplified schematic diagram illustrating the process of the invention used to regenerate the sodium sulfite scrubbing solutions for scrubbers used to remove the sulfur oxides from the flue gases of oil burning steam generators such as those used in oil fields. Such steam generators are typically located at different field positions and each is equipped with a scrubber system. FIG. 1 illustrates three such scrubbing systems SS for three different steam generators, although the number of scrubbing systems which may be accommodated by the process of the invention is merely a matter of design and is not meant to be limiting.

Each scrubbing system SS includes a quench section 11 and a scrubber section 12. The flue gases from the steam generator enter the quench section 11 as indicated at line 10, pass through the quench section 11 and scrubber section 12 where the sulfur oxides are removed, and the cleaned flue gases then flow out of stack 14 as indicated by line 15. Each scrubbing system SS circulates an aqueous scrubbing solution from a recirculation tank 16 through the quench section 11 and scrubber section 12 as indicated at line 18 to contact the flue gas stream with the scrubbing solution. The aqueous scrubbing solution contains sodium sulfite, sodium bisulfite and sodium sulfate and, depending on the pH of the scrubbing solution, may also contain some sodium hydroxide. If sodium carbonate (soda ash) is used as a makeup chemical for the scrubbing solution, the scrubbing solution may also contain some sodium carbonate, again depending on the pH of the scrubbing solution. As the scrubbing solution contacts the flue gases, sulfur dioxide in the flue gases will react with sodium sulfite and water in the scrubbing solution to form sodium bisulfite according to the following reaction:

$$SO_2 + H_2O + Na_2SO_3 \rightarrow 2NaHSO_3 \quad (1)$$

If sodium hydroxide is available in the scrubbing solution, sulfur dioxide in the flue gases will react therewith to form sodium sulfite according to the following equation:

$$2NaOH + SO_2 \rightarrow Na_2SO_3 + H_2O \quad (2)$$

and if sodium carbonate is available in the scrubbing solution, sulfur dioxide will react therewith to also form sodium sulfite according to the following equation:

$$Na_2CO_3 + SO_2 \rightarrow Na_2SO_3 + CO_2 \uparrow \quad (3)$$

The sulfur dioxide is thus removed from the flue gases and is absorbed into the scrubbing solution. The contact of the flue gases with the scrubbing solution also serves to remove some of the particulate matter from the flue gases which becomes suspended in the scrubbing solution. The liquid scrubbing solution is separated from the flue gases in the scrubber section 12 and returned to the recirculation tank 16 as shown by line 19 while the liquid free flue gas stream with the sulfur oxides removed passes out of stack 14.

As the scrubbing solution continues circulation through the quench section 11 and scrubber section 12, the sodium sulfite level is decreased and the sodium bisulfite level is increased. To maintain the sodium sulfite level in the scrubbing solution, some of the recirculating scrubbing is bled off through a control valve 20 and line 21 to the regeneration system RS which receives the bled off portion of the scrubbing solution from all of the scrubbing systems SS.

The regeneration system RS converts the sodium bisulfite in the withdrawn portion of the scrubbing solution back to sodium sulfite and generates some sodium hydroxide as will become more apparent to regenerate the withdrawn portion of the scrubbing solution. The regenerated scrubbing solution is returned to the recirculation tank 16 in each of the scrubbing systems SS as needed to maintain the scrubbing solution level in the recirculation tanks 16.

Some of the sodium values are lost in the regeneration process as will become more apparent so that the sodium value in the scrubbing solution in each of the recirculation tanks 16 is lowered as the regenerated portion of the scrubbing solution is returned to tanks 16. To restore this loss in sodium value, sodium hydroxide (caustic soda) or sodium carbonate (soda ash) is added to the recirculation tank 16 in a controlled manner as shown by line 22. These chemicals react with the sodium bisulfite in the scrubbing solution in tank 16 to produce sodium sulfite according to the following reactions:

$$NaOH + NaHSO_3 \rightarrow Na_2SO_3 + H_2O \quad (4)$$

or $$Na_2CO_3 + 2NaHSO_3 \rightarrow 2Na_2SO_3 + CO_2 \uparrow + H_2O \quad (5)$$

depending on which makeup chemical is used. As mentioned above, some of the sodium hydroxide or sodium carbonate may remain in the scrubbing solution depending on the pH thereof to react directly with the sulfur dioxide in the gas stream to form sodium sulfite as set forth in equations (2) and (3).

The withdrawn portions of scrubbing solution from the recirculation tanks 16 in the scrubbing systems SS are collected in a storage tank or tanks 25 in the regeneration system RS. By accumulating the scrubbing solution for regeneration in the storage tank 25, the fluctuating outputs from the scrubbing systems SS can be interfaced with the operation of the regeneration system RS as will become more apparent.

When a prescribed volume of scrubbing solution has been collected in tank 25, the scrubbing solution is supplied by line 24 to a reactor vessel RV at a prescribed rate until the volume of scrubbing solution in the tank 25 has been reduced to a minimum amount. While the scrubbing solution is in the reactor vessel RV, calcium oxide (CaO) in the form of pebble lime is added to the reactor vessel at line 26 for reaction with the scrubbing solution. The reaction which takes place in the reactor vessel RV is a two step reaction that generates solid calcium sulfite and converts the sodium bisulfite back to sodium sulfite. The calcium oxide first reacts with sodium sulfite and water in the scrubbing solution to produce sodium hydroxide as follows:

$$Na_2SO_3 + CaO + H_2O \rightarrow CaSO_3 + 2NaOH \quad (6)$$

The sodium hydroxide then reacts with the sodium bisulfite in the scrubbing solution to regenerate the sodium bisulfite to sodium sulfite as follows:

$$2NaOH + 2NaHSO_3 \rightarrow 2Na_2SO_3 + 2H_2O \quad (7)$$

The pH of the solution in the reactor vessel is usually such that some sodium hydroxide remains in the solution. The calcium sulfite formed by this reaction reacts with water in the scrubbing solution to produce a highly insoluble hydrate of calcium sulfite. Typically, the temperature of the solution is such that calcium sulfite hemihydrate ($CaSO_3 \cdot \frac{1}{2}H_2O$) is initially formed but further hydrates into calcium sulfite dihydrate ($CaSO_3 \cdot 2H_2O$) as it cools.

Heretofore, attempts to react pebble lime with the scrubbing solution have been unsuccessful because the reaction time was too long to be feasibly used. This is thought to be due to the reaction taking place at the surface of the pebble lime and the calcium sulfite ($CaSO_3$) and/or hydrate of calcium sulfite being produced forming a thin coating on the surface of the pebble lime to block contact between the scrubbing solution and the remaining calcium oxide in the pebble lime to virtually extinguish the reaction when less than ten percent (10%) of the calcium oxide available in the pebble lime has reacted.

The scrubbing solution and pebble lime in the reactor vessel RV are impinged against an impingement surface in the reactor vessel with a velocity of 8–10 feet per second. It has surprisingly been found that this action causes over ninety percent (90%) of the calcium oxide available in the pebble lime to react with the scrubbing solution within a time of about five minutes which is comparable to that associated with prior art regeneration processes using calcium hydroxide (slaked lime).

The pebble lime used in this process is commercially available in gravel size pieces with a major dimension less than about one-half inch and an average size of about one-fourth inch. The cost of such pebble lime is significantly less than commercially available slaked lime or the total cost of slaked lime produced by an on-site slaker. This pebble lime typically contains small amounts of inactive materials such as sand and the like. These inactive materials and the small amount of unreacted calcium oxide remain suspended in the scrubbing solution as residual particulate material. It has been surprisingly found that this residual particulate material enhances the settling rate and filterability of the reacted slurry in the reactor vessel.

It will thus be seen that the sodium sulfite level in the scrubbing solution is raised in the reactor vessel as the sodium bisulfite level is reduced. The insoluble hydrate of calcium sulfite, residual particulate matter from the pebble lime, and other particulate matter introduced into the reactor vessel with the scrubbing solution remain suspended in the liquid to form a slurry. This slurry is withdrawn from the reactor vessel RV and supplied to a gravity settler GS by line 28. The solids in the slurry settle by gravity in settler GS to form a more concentrated slurry at the bottom of the settler. Solids free regenerated scrubbing solution overflows from the top of the settler and is transferred to a regenerated liquid holding tank 29 via line 30. The concentrated slurry is removed from the bottom of settler GS via line 31 and supplied to a rotary vacuum filter VF which separates the solids from most of the liquid as a filter cake which is removed and disposed. The solids free liquid filtrate is also regenerated scrubbing solution and is removed from filter VF via line 32 to the holding tank 29 to be mixed with the regenerated scrubbing solution from the settler overflow.

The regenerated scrubbing solution in the holding tank 29 thus has an increased sodium sulfite level and decreased or depleted sodium bisulfite level as compared to the incoming scrubbing solution to the regeneration system RS. This regenerated scrubbing solution typically contains some free sodium hydroxide as well. The regenerated scrubbing solution from tank 29 is returned to a scrubber holding tank 34 via line 35 through a polishing filter PF which removes any solids from the regenerated scrubbing solution which may have escaped the vacuum filter VF. Make-up water to replace that lost in the scrubbing and regeneration process is added to holding tank 34 by line 36 and the regenerated scrubbing solution is returned to the recirculation tanks RT in the scrubbing systems SS as needed by line 38 to maintain the solution level therein.

Figure 2:
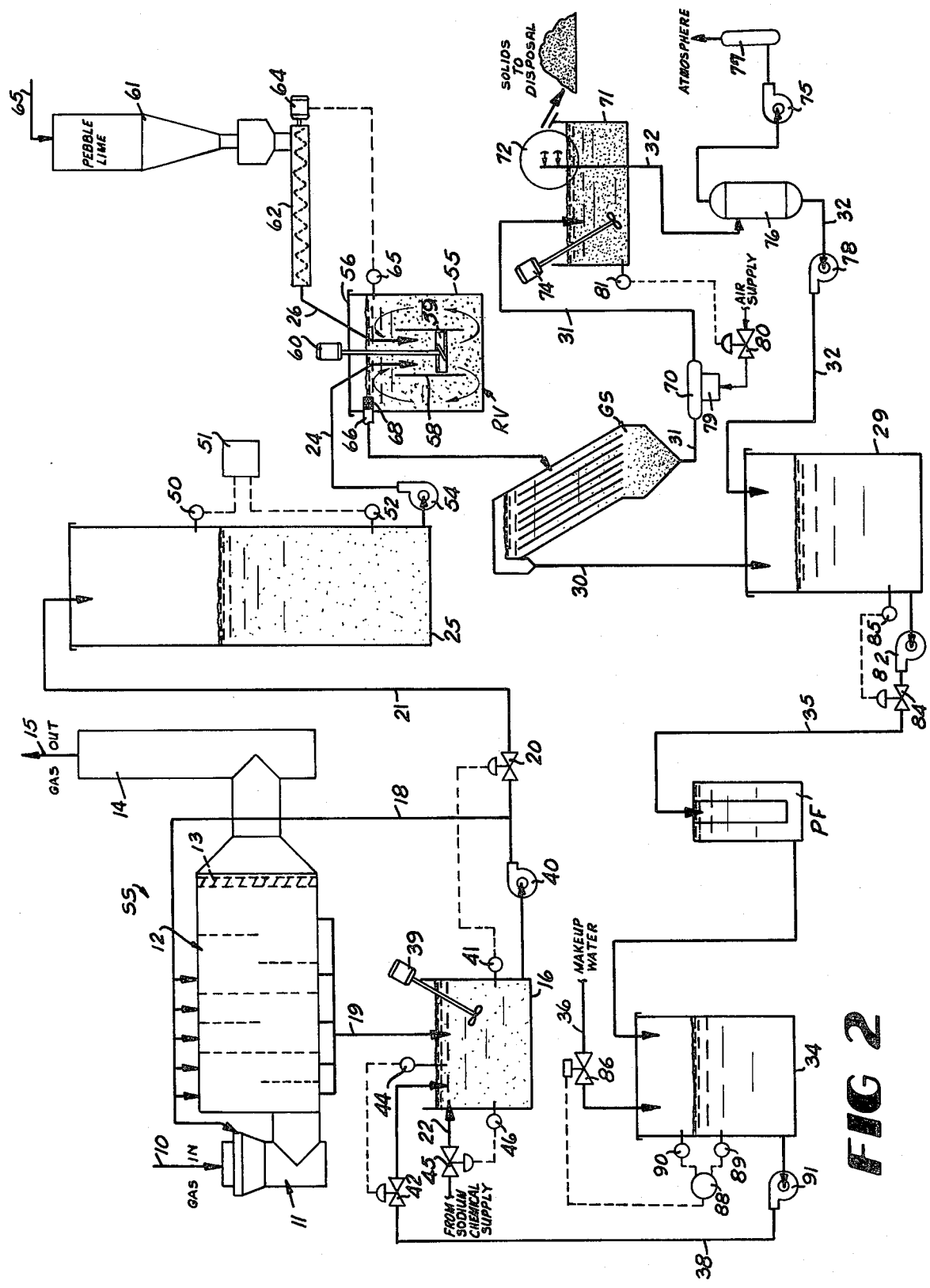
FIG. 2 is a more detailed flow sheet showing additional features of the process of the invention.

FIG. 2 is a more complete diagram of the system of FIG. 1. For sake of simplicity, only one scrubbing system SS is illustrated, it being understood that the additional scrubbing systems would be connected to the regeneration system as illustrated in FIG. 1. The gas stream, such as the flue gases from the oil fired steam generator, enter the quench section 11 of the scrubbing system SS at 10. These flue gases contain sulfur oxides mostly in the form of sulfur dioxide. The scrubbing solution is sprayed into the incoming flue gas stream in the quench section 11 to reduce its temperature and saturate the flue gas stream. The cooled flue gas stream then passes through the scrubber section 12. The scrubber section 12 is a low energy baffle type scrubber equipped with a liquid separator 13 at its downstream end to remove any liquids from the flue gas stream as it exits the scrubbing section 12 to the discharge stack 14. The scrubbing solution is also sprayed into the gas stream as it passes through the scrubbing section 12 while the baffles in the scrubbing section 12 create sufficient turbulence in the gas stream to insure good liquid to gas contact. Any liquid droplets entrained in the gas stream are removed by the liquid separator 13. A scrubbing system of this type is shown in application Ser. No. 237,292 filed Feb. 24, 1981. It is to be understood, however, that the process of this invention is not limited to this particular type scrubbing system but may likewise be used with scrubbing systems or contactors of the venturi, packed column, sieve plate, or spray types.

The scrubbing solution from the recirculation tank 16 is sprayed into the flue gas stream in the quench section 11 and scrubbing section 12 by recirculation pump 40 through line 18. This scrubbing solution is an aqueous solution predominately containing sodium sulfite, sodium bisulfite and sodium sulfate. Depending on the pH of the scrubbing solution, it may also contain small amounts of sodium hydroxide introduced into the primary scrubbing solution as the regenerated scrubbing solution is returned to the recirculation tank and, if caustic soda is used as the makeup sodium chemical, as the caustic soda is added to the recirculation tank. If soda ash is used as the makeup sodium chemical, the scrubbing solution may also contain small amounts of sodium carbonate depending on the pH. The pH of the scrubbing solution should be maintained sufficiently high to cause the sulfur dioxide in the gas stream to react with the scrubbing solution at a reasonably acceptable rate. On the other hand, the pH of the scrubbing solution should be maintained sufficiently low to prevent significant reaction with the carbon dioxide in the gas stream with the scrubbing solution in order to conserve the sodium consumption in the scrubbing operation and prevent scale formation in the scrubbing system. The lowest pH should be about 6 to insure good sulfur dioxide absorption and the highest pH should be about 7.5 to minimize the carbon dioxide reaction. If the pH of the scrubbing solution is maintained below about 7, virtually no free sodium hydroxide or sodium carbonate will be present in the scrubbing solution, but if the scrubbing solution is operated with a pH above 7, then some free sodium hydroxide or sodium carbonate will be maintained in the scrubbing solution. Typically, the pH of the scrubbing solution is maintained at some substantially constant value in the range of 6-7.

As the scrubbbing solution contacts the flue gas stream, the sulfur dioxide in the gas stream converts sodium sulfite in the scrubbing solution to sodium bisulfite to absorb the sulfur dioxide into the scrubbing solution. Likewise, if any free sodium hydroxide and/or sodium carbonate are present in the scrubbing solution, the sulfur dioxide will react therewith to form sodium sulfite. This serves to reduce the sodium sulfite level and raise the sodium bisulfite level in the scrubbing solution. The scrubbing solution is then collected and returned by gravity to the recirculation tank 16 by line 19 to be recirculated back through the quench section 11 and scrubber section 12 by pump 40 for reaction with the gas stream. Any particulate matter removed from the gas stream also becomes suspended in the scrubbing solution and is maintained in suspension in tank 16 by agitator 39.

As the sulfur dioxide reacts with the scrubbing solution to form sodium bisulfite, the scrubbing solution becomes more acidic and the pH is lowered. To maintain the pH of the scrubbing solution, more sodium compounds are added thereto as will become more apparent. This serves to increase the density of the scrubbing solution with this increase in density being proportional to the amount of sulfur dioxide removed from the gas stream and indicative of the increase in sodium bisulfite concentration in the scrubbing solution.

As indicated above, the valve 20 is used to divert a portion of the scrubbing solution for regeneration as the sodium bisulfite concentration increases. Various methods may be used to control valve 20. One method is to regulate the valve 20 using the density of the scrubbing solution and is illustrated in FIG. 2. A controller 41 on tank 16 senses the density of the scrubbing solution and regulates the proportioning valve 20 so that the amount of scrubbing solution from recirculation pump 40 diverted to line 21 by valve 20 is increased as the density of the scrubbing solution increases above a prescribed density value and is decreased as the density of the scrubbing solution is reduced toward the prescribed density value. Such controllers are commercially available and will not be described in detail. As will become more apparent, the density of the regenerated scrubbing solution added to the recirculation tank 16 is less than the prescribed density value setting of the controller 41 so that the addition of the regenerated scrubbing solution to the recirculation tank 16 lowers the density of the scrubbing solution in the tank. The controller 41, then, serves to maintain the density of the scrubbing solution at the prescribed density value set in the controller 41. The particular prescribed density value set in the controller 41 will depend on the sodium compound concentrations to be maintained in the scrubbing solution. For example, a prescribed density value of 1.05 gm/cm$^3$ has been found appropriate to maintain a scrubbing solution with 1.5 percent by weight sodium sulfite, 1.7 percent by weight sodium bisulfite, and 1.7 percent by weight sodium sulfate.

The amount of regenerated scrubbing solution returned to the recirculation tank 16 via line 38 is regulated by a proportioning flow control valve 42. Valve 42 is controlled by a liquid level controller 44 which senses the level of the liquid in tank 16 and regulates valve 42 to keep the liquid level in tank 16 substantially constant.

The sodium hydroxide (caustic soda) or sodium carbonate (soda ash) to replace the sodium values lost in the regeneration process is added to tank 16 as a concentrated solution from an appropriate source (not shown) thorugh line 22. The rate at which the sodium chemical solution is added to tank 16 is controlled by a proportioning valve 45 in line 22. One convenient method of operating valve 45 is using the pH of the scrubbing solution. Valve 45 is controlled by a controller 46 which senses the pH of the scrubbing solution being circulated through the quench section 11 and scrubbing section 12 and adds enough of the sodium chemical solution to keep the pH of the solution at the desired value. One typical value is a pH of 6.5.

The scrubbing solution bled off through valve 20 in each of the scrubbing systems SS is supplied to the storage tank 25 for accumulation. The storage tank 25 has a sufficiently large capacity to accumulate an amount of scrubbing solution to operate the regeneration system RS for some convenient period of time as will become more apparent. It will be appreciated that, while the density of the scrubbing solution supplied to the tank 25 from the different scrubbing systems is about the same, the flow rate of the scrubbing solution from the different scrubbing systems SS may vary significantly. This is because some of the steam generators may be periodically shut down and because the sulfur content of the fuel used in the different steam generators may vary, thereby varying the amount of sulfur dioxide produced and the rate the density of the scrubbing solution is increasing.

The storage tank 25 is equipped with a starting liquid level sensor 50 located about two-thirds of the height of tank 25 which senses when the level of scrubbing solution in the tank 25 reaches this height to signal an automatic start/stop circuit 51 to start operation of the regeneration system RS and a lower liquid level sensor 52 located in the lower portion to the tank 25 to signal the automatic start/stop circuit 51 to shut down the operation of the regeneration system RS when the scrubbing liquid level in the tank 25 has been lowered to sensor 52. This permits the automatic operation of the regeneration system RS as will become more apparent.

The scrubbing solution in storage tank 25 is pumped to the reactor vessel RV through line 24 by feed pump 54. The feed pump 54 is under the control of the automatic start/stop circuit 51 as will become more apparent. The pump 54 pumps the scrubbing solution at a prescribed substantially constant rate from the storage tank 25 as will become more apparent.

The reactor vessel RV includes a cylindrical tank 55 equipped with a cover 56 and defines a reaction chamber therein into which the scrubbing solution is pumped by the pump 54. The tank 55 has a cylindrical draft tube 58 mounted therein with a vertically extended passage therethrough open at the upper and lower ends of the draft tube 58. The draft tube 58 has a diameter smaller than the diameter of the tank 55 and is located in the tank 55 concentrically therewith. It will be seen that the lower end of the draft tube 58 is spaced above the bottom of the tank 55 while the upper end of the draft tube 58 is spaced below the surface of the scrubbing liquid in the tank 55. The draft tube 58 is provided with a motor driven impeller 59 rotating in close clearance with the draft tube 58 so that substantially all of the solution passing down through the draft tube 58 will be forced through the impeller 59. The impeller 59 is driven by a motor 60 which rotates the impeller 59 at a rate such that the scrubbing solution in the tank 55 is forced down through the draft tube 58 at a velocity of at least 8–10 feet per second. This causes the scrubbing solution in the tank 55 to impinge against the bottom of the tank 55. The scrubbing solution being pumped into the tank 55 through line 24 by pump 54 is introduced into the upper end of the draft tube 58 so that it passes through the impeller 59. The rotational speed of the impeller 59 will depend on the impeller design and pitch to produce the desired flow velocity through the draft tube.

The pebble lime is fed into the reactor vessel RV from a storage bin 61 by a screw type conveyor 62 with a variable speed drive 64. The pebble lime in the storage bin 61 is replenished from large storage silos (not shown) through the line 65 in conventional manner. The pebble lime is discharged from the conveyor 62 through line 26 into the upper end of the draft tube 58 so that pieces of pebble lime are also driven through draft tube 58 by the impeller 59 to impinge against the bottom of the tank 55 at the same velocity as the scrubbing solution of at least about 8-10 feet per second. It will be appreciated that the pieces of pebble lime will likewise impinge against the impeller 59 and against each other due to the turbulent flow through the draft tube 58. It will also be seen that both the pebble lime and the scrubbing solution will be recirculated through the draft tube 58 by the impeller 59 along the flow paths indicated in FIG. 2. The speed of the conveyor drive 64 is controlled by a pH controller 65 which detects the pH of the solution in the reactor vessel RV and controls the speed of the drive 64 to supply sufficient pebble lime to the reactor vessel RV to insure complete conversion of the sodium bisulfite in the scrubbing solution to sodium sulfite. Typically, this is provided by causing the controller 65 to maintain the pH of the solution in the reactor vessel RV at about 8.2.

As the pebble lime reacts with the scrubbing solution as set forth above, the calcium sulfite and hydrate of calcium sulfite being formed try to coat the pieces of pebble lime to block further reaction between the pebble lime and the scrubbing solution. Because the pieces of pebble lime are being impinged against each other, the impeller 59 and the bottom of the tank 55, the abrading action of such impingement mechanically dislodges the calcium sulfite and hydrate of calcium sulfite from the surface of the pieces of pebble lime so that the reaction can continue until the size of the pieces of pebble lime have been reduced to a point where the abrading action can no longer remove the calcium sulfite coating from the surface thereof. This usually occurs when about 90-95 percent of the calcium oxide available in the pebble lime has reacted with the scrubbing solution and the size of the pieces of pebble lime have been reduced to less than about 100 microns. The solid hydrate of calcium sulfite formed by the reaction as well as any particulate matter introduced into the reactor vessel RV with the scrubbing solution and the remaining unreacted residue from the pebble lime remains suspended in the solution to form a reacted slurry. The reacted slurry is removed from the tank 55 through a discharge pipe 66 adjacent the upper end of the tank 55 through a screen 68 on the end of the discharge pipe 66 to prevent the pieces of oversize pebble lime from flowing out through pipe 66. The turbulence in the reactor vessel RV is sufficient to remove the oversize pieces of pebble lime drawn onto the surface of the screen 68 as the reacted slurry passes through the screen 68 to prevent these oversize pieces of pebble lime that have not fully reacted from blinding off the screen 68. The reacted slurry is shown flowing to the gravity settler GS through line 28 by gravity; however, this is merely for the sake of convenience and the reacted slurry may be pumped to the gravity settler GS. The reacted slurry flowing to the gravity settler GS typically has a solids concentration of about 1-2 percent by weight.

The gravity settler GS is a plate type settler and is equipped with angled plates so that the solids settle onto and flow down the plates toward the bottom of the settler whereas solids free liquid overflows the top of the settler. The solids free liquid flowing out of the top of the gravity settler GS typically flows by gravity to the holding tank 29. A more concentrated slurry forms in the bottom of the gravity settler GS containing about ten percent by weight solids and is pumped to the vacuum filter VF through line 31 by an air operated diaphragm type pump 70. It has surprisingly been found that the settling rate of the reacted slurry from the reactor vessel RV is over four times as fast as that associated with prior art regeneration processes using slaked lime, thereby permitting the much faster separation of the solids in the settler GS and a much lower volume of concentrated slurry which must be processed through the vacuum filter VF as compared with prior art processes.

One of the problems with using a plate type gravity settler, however, is that this type settler is sensitive to varying flow rates therethrough and to varying solids concentrations in the incoming slurry. This process is able to compensate for this problem by providing a scrubbing solution SS at a substantially constant density so that, after the scrubbing solution has reacted with the pebble lime in the reactor vessel RV, the solids level, although higher, will also be about constant. Since the reactor vessel RV overflows by gravity into the gravity settler GS, and because the pump 54 pumps the scrubbing solution into the reactor vessel RV at a substantially constant rate, the flow rate of the reacted slurry into the gravity settler GS will thus be substantially constant. By accumulating the scrubbing solution in the storage tank 25, the rate at which the scrubbing solution is pumped out of the tank 25 by the feed pump 54 can thus be independent of the flow rate of the scrubbing solution into the tank 25.

The vacuum filter VF includes a filter tank 71 into which the thickened slurry from the gravity settler GS is discharged. A fabric covered filter drum 72 is rotated through the slurry in the tank 71 and the liquid is removed from the tank 71 through the rotary drum to form a moist filter cake of the solids on the surface of the drum which are then scraped off the surface of the drum in conventional manner. An agitator 74 is provided to keep the solids in the slurry from settling in the tank 71. The moist filter cake removed from the drum is then discharged to disposal. The moist filter cake includes the solids in the slurry which consist of solid hydrate of calcium sulfite, any particulate matter introduced into the regeneration system in the scrubbing solution from the scrubbing systems SS and the residual solid materials from the reacted pebble lime together with some of the scrubbing solution. Typically, this filter cake is about 50 percent solids. Because some of the scrubbing solution is lost in the filter cake from the vacuum filter VF, it will be appreciated that some of the sodium salts in the scrubbing solution will likewise be lost. For instance, about 1.9 percent of the sodium sulfite available in the reacted slurry from the reactor vessel RV and about 1.9 percent of the sodium sulfate in the reacted slurry from the reactor vessel RV are lost in the filter cake from the vacuum filter VF. The filtrate is sucked through the filter drum in the vacuum filter VF by a vacuum pump 75 through line 32 to a vacuum receiver 76 which separates the air from the liquid so that the air is exhausted through pump 75 and a silencer 77 to the atmosphere while the liquid filtrate from the vacuum filter VF is collected in the receiver 76. The liquid filtrate received by the receiver 76 is likewise regenerated scrubbing solution and a filtrate transfer pump 78 transfers the liquid filtrate from receiver 76 through line 32 to the holding tank 29 so that the liquid filtrate from the vacuum filter VF is combined with the clear liquid overflow from the gravity settler GS in tank 29.

The air powered driving device 79 on the diaphragm pump 70 supplying the concentrated slurry from the gravity settler GS to the vacuum filter VF is connected to an appropriate air supply through a proportioning valve 80 controlled by a liquid level controller 81. The controller 81 senses the level of the liquid in the tank 71 of vacuum filter VF by hydrostatic pressure and controls the flow of air to the pump drive 79 to operate pump 70 at a rate to maintain a substantially constant slurry level in tank 71.

The regenerated scrubbing solution in the holding tank 29 is pumped to the scrubber holding tank 34 by a pump 82 through line 35. The output flow rate of pump 82 is controlled by proportioning valve 84 in line 35. Valve 84 is controlled by level controller 85 in tank 29 which senses the liquid level in tank 29 by hydrostatic pressure and regulates the flow of the regenerated scrubbing solution from tank 29 so as to keep a substantially constant liquid level in tank 29.

The polishing filter PF interposed in line 35 is a fabric type filter and serves as a backup to remove any solids that might remain in the regenerated scrubbing solution. Typically, two of these filters are used in parallel so that one can be cleaned while the other is operating.

The water which is lost from the scrubbing solution by being vaporized in the scrubbing systems SS and by being removed in the moist filter cake from the vacuum filter VF is added to the scrubber holding tank 34 through line 36. The amount of makeup watter added is controlled by a solenoid valve 86. Valve 86 is controlled by a relay circuit 88 activated by a low level switch 89 which activates relay circuit 88 to open valve 86 when the liquid level in tank 34 drops to one-half full and deactivated by upper liquid level switch 90 to close valve 86 when the liquid level in tank 34 is raised to three-fourths full.

The solution from tank 34 is pumped to the recirculation tanks 16 through line 38 by a feed pump 91. The flow control valve 42 at each of the recirculation tanks 16 regulates the amount of solution returned to each tank 16. When the density of the scrubbing solution diverted to tank 25 is about 1.05 gm/cm$^3$, the solution returned to the recirculation tanks 16 is about 1.03 gm/cm$^3$.

The regeneration system RS must be able to handle the volume of scrubbing solution diverted for regeneration when all of the scrubbing systems SS connected thereto are operating at capacity. Thus, the reactor vessel RV, gravity settler GS and vacuum filter VF are designed to operate at the highest total volume flow rate of scrubbing solution likely to be received when all of the scrubbing systems SS are operating at capacity. Frequently, however, some of the steam generators and the scrubbing systems associated therewith are shut down for periods of time especially in oil field installations and thus reduces the total volume of scrubbing solution diverted for regeneration. Likewise, when fuels used to fire the steam generators have a lower sulfur content than that used to design the system, the total volume of scrubbing solution diverted for regeneration is likewise reduced. Since the regeneration system RS operates at constant flow, it will be seen that it is necessary to periodically stop the operation of the regeneration system when the total volume flow rate of scrubbing solution diverted for regeneration drops for a significant period of time and then restart its operation after a sufficient volume to operate the regeneration system for a prescribed period has been accumulated in the storage tank 25.

The overall operation of the regeneration system RS is provided by the start/stop controller 51. Controller 51 is operatively connected to the motor driving feed pump 54, the motor driving the filter drum 72 of vacuum filter VF, the motor driving the vacuum pump 75, and the motor driving the filtrate pump 78. When the flow rate of the scrubbing solution to the tank 25 drops below the rate at which the solution from tank 25 is being regenerated, the level of the scrubbing solution in tank 25 will start to drop. When the level in tank 25 drops to the lower liquid level sensor 52 on tank 25, the start/stop controller 51 initiates shut down of the regeneration system RS. Controller 51 immediately stops the feed pump 54 to stop the flow of scrubbing solution into the reactor vessel RV which also stops the flow of the reacted slurry from the reactor vessel RV to the gravity settler GS. The controller 51, however, maintains operation of the vacuum filter VF, vacuum pump 75 and filtrate pump 78 through an appropriate time delay device such as a relay to reduce the solids level in the vacuum filter tank 71. This prevents leaving a thick filter cake on the filter drum 72 to dry out and make it difficult to restart the vacuum filter VF. While different time periods may be used, a time delay of about ten minutes has been found adequate. After the time delay, the controller 51 stops the drum 72 of the vacuum filter VF and the vacuum pump 75 but continues the operation of the filtrate pump 78 for an additional time delay to reduce the liquids level in the vacuum receiver 76. While this additional time delay may be varied, a time of about one minute has been found adequate. After this additional time delay, the filtrate pump 78 is stopped by controller 51 to effect shutdown. The impeller 59 in the reactor vessel RV is operated at all times, even during shutdown to prevent the solids from settling to the bottom of tank 55.

After shutdown of the regeneration system RS, the scrubbing solution diverted to tank 25 raises the liquid level until it reaches the starting liquid level sensor 50 in tank 25 to cause the start/stop controller 51 to initiate startup of the regeneration system RS. As soon as startup is initiated, controller 51 starts the filter drum 72 of vacuum filter VF, the vacuum pump 75 and the filtrate pump 78; however, the start of operation of feed pump 54 is delayed with an appropriate time delay device until the vacuum filter VF has reached operational speed. While this time delay may be varied, a time delay of about one minute has been found adequate. After the time delay, the feed pump 54 is started to complete startup of the regeneration system RS.

Thus, the operation of the regeneration system RS is automated so as not to require an on-site operator. Further, by having an automated startup and shutdown operation, the regeneration system RS is able to handle varying input flow rates from the scrubbing systems SS even though the solution flow rate through the regeneration system RS is constant.

By way of example, a plurality of scrubbing systems SS operating at capacity, supply a total of about 1200 gpm of scrubbing solution to the storage tank 25 for regeneration. This scrubbing solution contains, by weight, about 1.7 percent sodium bisulfite, 1.5 percent sodium sulfite, 1.7 percent sodium sulfate and 0.2 percent suspended particulate matter. This scrubbing solution has a pH of about 6.5 and a density of about 1.05 gm/cm$^3$. The storage tank 25 has about a 74,000 gallon capacity and may comprise a plurality of storage tanks connected in parallel with the same liquid level maintained in each tank. The regeneration system RS is started when about 50,000 gallons of scrubbing solution has been accumulated in tank 25 so that the regeneration system will be operated a minimum of about 30–45 minutes each time it is started.

The feed pump 54 pumps the scrubbing solution from tank 25 into the reactor vessel RV at a constant flow rate of about 1200 gpm. The reactor vessel RV has an operating capacity of about 6,000 gallons and remains filled with solution at all times. The motor 60 is 5 HP and operates at about 1200 rpm. The reacted slurry flows out of the reactor vessel RV to the gravity settler GS at the same 1200 gpm as the solution is fed to the reactor vessel RV giving an average solution dwell time of about five minutes in the reactor vessel RV.

The pebble lime storage bin 61 has about a 65 cubic foot storage capacity and is resupplied from a larger storage silo with a 26,000 cubic foot storage capacity. The conveyor 62 has a variable delivery capacity of about 20–200 cubic feet of solids per hour. At the sodium bisulfite concentration enumerated above, about 3,600 pounds per hour of pebble lime is required to react with the scrubbing solution to convert the sodium bisulfite to sodium sulfite. The pebble lime has about twelve percent non-reactable solids content.

The reacted slurry discharged into the gravity settler has about two percent by weight suspended solids and a pH of about 8.2. The gravity settler is designed to operate an inlet liquid flow of about 1200 gpm and has about 5,800 square feet of settling area. The solids free liquid overflows the gravity settler GS at about 1020 gpm and a density of about 1.036 gm/cm$^3$ into the holding tank 29 which has about a 3,000 gallon capacity. The concentrated slurry at the bottom of settler GS has about ten percent by weight suspended solids. The diaphragm pump 70 pumps the concentrated slurry from settler GS into the tank 71 on vacuum filter VF at a modulated rate to maintain a constant liquid level in tank 71. This pumping rate averages about 180 gpm.

The rotary drum 72 of vacuum filter VF is about 12 feet in diameter and about 12 feet long to give a filtration surface area of about 456 square feet. The filter VF is designed to process about 180 gpm of concentrated slurry and to produce a moist solids cake of about 45–50 percent solids with a clear filtrate output of about 160 gpm. The filtrate receiver 76 is about 3 feet in diameter and 6 feet tall. The vacuum pump 75 is about 75 HP and designed to handle about 1,400 scfm at 22 inches mercury vacuum. The filtrate pump is capable of pumping about 160 gpm of filtrate to the holding tank 29 from the receiver 78. This filtrate also has a density of about 1.036 gm/cm$^3$. The regenerated scrubbing solution in the holding tank 29 contains substantially no sodium bisulfite, about 2.6 percent by weight sodium sulfite, and about 1.7 percent by weight sodium sulfate. Because the pH of the regenerated scrubbing solution is about 8.2, a small amount of free sodium hydroxide will also be present.

The pump 82 transferring the regenerated scrubbing solution from tank 29 to the scrubber holding tank 34 has a pumping capacity of about 1200 gpm and valve 84 is controlled so that about 2,500 gallons of regenerated scrubbing solution is maintained in tank 29. The polishing filter PF is equipped with filter bags sized for capture of 10 micron size particles and operates at inlet pressures between 20 psig when clean to 40 psig when dirty.

The addition of the makeup water to the solution in the scrubber holding tank typically reduces the density of the solution being returned to the recirculation tanks 16 to about 1.03 gm/cm$^3$. For this example, the consumption and production rates of the regeneration process are set forth below.

| | |
|---|---|
| Solution feed rate (line 21) | 625,518 lbs/hr |
| Pebble lime feed rate (line 26) | 3,636 lbs/hr |
| Moist filter cake production rate | 21,637 lbs/hr |
| CaSO$_3$.2H$_2$O in filter cake | 8,122 lbs/hr |
| CaO in filter cake | 292 lbs/hr |
| Particulates in filter cake | 1,905 lbs/hr |
| Sodium chemical makeup (line 22) | |
| as caustic soda (NaOH) | 320 lbs/hr |
| as soda ash (Na$_2$CO$_3$) | 425 lbs/hr |
| Equivalent SO$_2$ removed from solution | 3,589 lbs/hr |

What is claimed as invention is:

1. A method of regenerating an aqueous solution containing sodium sulfite and sodium bisulfite comprising the steps of:
    (a) introducing calcium oxide in the form of pebble lime into the solution containing the sodium sulfite and sodium bisulfite;
    (b) impinging substantially all of the pebble lime in the solution and the solution against an impingement surface to mechanically remove any film of calcium sulfite formed on the surface of the pebble lime so that substantially all of the calcium oxide in the pebble lime reacts with the solution to convert the sodium bisulfite to sodium sulfite and form an aqueous slurry containing dissolved sodium sulfite, solid calcium sulfite and the unreacted residue of the pebble lime whereby the unreacted residue enhances the settling rate of the solids in the slurry; and
    (c) separating the solid calcium sulfite from the slurry by settling the slurry to form a regenerated aqueous solution having a reduced sodium bisulfite concentration.

2. The method of claim 1 wherein the step of impinging substantially all of the pebble lime against the impingement surface includes repeatedly impinging the pebble lime against the impingement surface until about 90% of the calcium oxide in the pebble lime has reacted with the solution.

3. The method of claim 1 wherein the step of impinging substantially all of the pebble lime against the impingement surface includes impinging the pebble lime against the impingement surface with a velocity of at least 8–10 feet per second.

4. The method of claim 1 further including the step of introducing the solution into a closed reactor vessel prior to introducing the pebble lime into the solution, wherein the step of introducing the pebble lime into the solution includes introducing the pebble lime into the solution while in said closed reactor vessel, and wherein the step of impinging substantially all of the pebble lime and the solution against the impingement surface takes place in said reactor vessel.

5. The method of claim 4 further including the step of withdrawing the aqueous slurry from the reactor vessel through a screen to keep the pebble lime not fully reacted with the solution in the reactor vessel prior to the step of separating the solid calcium sulfite from the slurry while maintaining sufficient turbulence in the flow of the aqueous slurry across the screen to keep those pieces of pebble lime too large to pass through the screen from blinding the screen.

6. The method of claim 4 wherein the step of impinging substantially all of the pebble lime and the solution includes circulating the solution and the pebble lime through a draft tube in the reactor vessel with an impeller in close clearance with the draft tube so that substantially all of the pebble lime is contacted by the blades of the impeller as the pebble lime passes through the draft tube.

7. The method of claim 6 wherein the pebble lime is circulated through the draft tube at a velocity of 8–10 feet per second until at least about ninety percent of the calcium oxide in the pebble lime has reacted with the sodium bisulfite in the solution.

8. The method of claim 7 wherein the step of separating the solid calcium sulfite from the aqueous slurry includes:
passing the aqueous slurry through a plate type settler to cause the solids in the slurry to settle by gravity toward the lower end of the settler to form a concentrated slurry at the lower end of the settler and a solids free aqueous solution at the upper end of the settler;
withdrawing the solids free aqueous solution from the upper end of the settler as an overflow;
withdrawing the concentrated slurry from the lower end of the settler as an underflow;
filtering the concentrated slurry to produce a solids free aqueous solution a filtrate; and
combining the solids free aqueous solution from the settling zone with the solids free aqueous solution filtrate to form a regenerated aqueous scrubbing solution having a reduced sodium bisulfite concentration.

9. The method of claim 8 further including the step of controlling the density of the scrubbing solution introduced into the reactor vessel so as to maintain a substantially constant solids concentration in the aqueous slurry formed in the reactor vessel.

10. A process for removing gaseous sulfur oxides from a gas stream by contacting the gas stream with a circulating aqueous scrubbing solution containing sodium sulfite, sodium bisulfite and sodium sulfate so that the sulfur oxides react with the sodium sulfite in the scrubbing solution to increase the sodium bisulfite content, said process comprising the steps of:
monitoring the density of the scrubbing solution;
withdrawing a portion of the circulation scrubbing solution in response to the increase in density of the scrubbing solution to a storage tank;
when the withdrawn portion of the scrubbing solution in the storage tank reaches a prescribed starting level, transferring the scrubbing solution from the storage tank to a reactor vessel at a substantially constant flow rate;
introducing calcium oxide in the form of pebble lime into the scrubbing solution in the reactor vessel for reaction with the scrubbing solution;
repeatedly impinging substantially all of the pebble lime and scrubbing solution in the reactor vessel against an impingement surface in the reactor vessel to mechanically remove any film of calcium sulfite formed on the surface of the pebble lime as the solution reacts with the calcium oxide in the pebble lime so that substantially all of the pebble lime reacts with the solution to form an aqueous slurry containing increased sodium sulfite content, solid calcium sulfite and the unreacted residue of the pebble lime whereby the settling rate of the slurry is greatly enhanced;
withdrawing the aqueous slurry from the reactor vessel at substantially the same flow rate as the scrubbing solution is transferred to the reactor vessel;
forcing the withdrawn aqueous slurry through a plate type settler so that the solid calcium sulfite in the aqueous slurry settles by gravity to produce a concentrated slurry at the lower end of the settler and a substantially solids free aqueous solution at the upper end of the settler;
withdrawing the solids free aqueous solution from the upper end of the settler as an overflow;
withdrawing the concentrated slurry from the lower end of the settler as an underflow;
filtering the concentrated slurry in a rotary vacuum filter and recovering the substantially solids free aqueous solution produced as a filtrate;
combining the substantially solids free aqueous solution withdrawn from the settler with the substantially solids free aqueous solution from the rotary vacuum filter to produce a regenerated scrubbing solution with a reduced sodium bisulfate concentration; and
returning the regenerated scrubbing solution to the circulating scrubbing solution.

11. The method of claim 10 further including the step of starting operation of the rotary vacuum filter a first prescribed period of time before transfer of the scrubbing solution from the storage tank to the reactor vessel is started.

12. The method of claim 11 further including the steps of:
stopping the transfer of the scrubbing solution from the storage tank to the reactor vessel when the scrubbing solution in the storage tank is lowered to a prescribed minimum level; and
continuing to operate the rotary vacuum filter for a second prescribed period of time after transfer of the scrubbing solution from the storage tank to the reactor vessel is stopped.

* * * * *